United States Patent [19]
Mirzabekov et al.

[11] Patent Number: 5,905,024
[45] Date of Patent: May 18, 1999

[54] METHOD FOR PERFORMING SITE-SPECIFIC AFFINITY FRACTIONATION FOR USE IN DNA SEQUENCING

[75] Inventors: Andrei Darievich Mirzabekov; Yuri Petrovich Lysov; Svetlana A. Dubley, all of Moscow, Russian Federation

[73] Assignee: University of Chicago, Chicago, Ill.

[21] Appl. No.: 08/768,893

[22] Filed: Dec. 17, 1996

[51] Int. Cl.$^6$ .............................. C12Q 1/68; C12P 19/34; C07H 21/02; G01N 33/52
[52] U.S. Cl. .................... 435/6; 435/91.2; 435/91.21; 427/2.11; 436/94; 436/800; 436/807; 436/809; 436/527; 436/528; 536/23.1; 536/24.3; 536/24.31; 536/24.32; 536/24.33
[58] Field of Search ..................... 435/6, 91.2, 91.21; 536/23.1, 24.3, 24.31, 24.32, 24.33; 436/94, 800, 807, 809, 527, 528; 427/2.11

[56] References Cited

U.S. PATENT DOCUMENTS

| | | | |
|---|---|---|---|
| 5,503,980 | 4/1996 | Cantor | 435/6 |
| 5,525,464 | 6/1996 | Drmanac et al. | 435/6 |
| 5,552,270 | 9/1996 | Kharpko et al. | 435/6 |

FOREIGN PATENT DOCUMENTS 649 852 A1  4/1995  European Pat. Off. .

*Primary Examiner*—W. Gary Jones
*Assistant Examiner*—Jeffrey Fredman
*Attorney, Agent, or Firm*—Cherskov & Flaynik

[57] ABSTRACT

A method for fractionating and sequencing DNA via affinity interaction is provided comprising contacting cleaved DNA to a first array of oligonucleotide molecules to facilitate hybridization between said cleaved DNA and the molecules; extracting the hybridized DNA from the molecules; contacting said extracted hybridized DNA with a second array of oligonucleotide molecules, wherein the oligonucleotide molecules in the second array have specified base sequences that are complementary to said extracted hybridized DNA; and attaching labeled DNA to the second array of oligonucleotide molecules, wherein the labeled re-hybridized DNA have sequences that are complementary to the oligomers. The invention further provides a method for performing multi-step conversions of the chemical structure of compounds comprising supplying an array of polyacrylamide vessels separated by hydrophobic surfaces; immobilizing a plurality of reactants, such as enzymes, in the vessels so that each vessel contains one reactant; contacting the compounds to each of the vessels in a predetermined sequence and for a sufficient time to convert the compounds to a desired state; and isolating the converted compounds from said array.

6 Claims, 9 Drawing Sheets

| DNA LENGTH, L | DNA FRAGMENTS | | OLIGOMER LENGTH, m | THE NUMBER OF OLIGONUCLEOTIDES IN ARRAY | | | | | | $n_1/n$ |
|---|---|---|---|---|---|---|---|---|---|---|
| | LENGTH, l | NUMBER, K | | P=90% | | P=95% | | P=99% | | |
| | | | | N | n | N | n | N | n | |
| 1. 4000 | 256 | 16 | 6 | 96 | 59 | 125 | 77 | 192 | 119 | 0.61 |
| | | | 7 | 191 | 41 | 248 | 53 | 382 | 82 | 0.89 |
| 2. 30000 | 256 | 120 | 7 | 931 | 780 | 1211 | 1015 | 1861 | 1560 | 0.35 |
| | | | 8 | 956 | 348 | 1243 | 453 | 1911 | 697 | 0.79 |
| 3. 30000 | 4096 | 8 | 7 | 59 | 50 | 77 | 66 | 118 | 101 | 0.36 |
| | | | 8 | 58 | 22 | 76 | 29 | 116 | 45 | 0.80 |
| 4. 100000 | 4096 | 25 | 8 | 169 | 133 | 220 | 173 | 338 | 266 | 0.43 |
| | | | 9 | 216 | 69 | 281 | 90 | 431 | 139 | 0.82 |
| 5. 500000 | 4096 | 125 | 9 | 1028 | 881 | 1337 | 1146 | 2056 | 1763 | 0.33 |
| | | | 10 | 959 | 369 | 1248 | 481 | 1918 | 739 | 0.78 |
| 6. 4000000 | 32768 | 125 | 11 | 779 | 485 | 1013 | 631 | 1557 | 970 | 0.59 |
| | | | 12 | 1503 | 325 | 1956 | 423 | 3006 | 650 | 0.88 |

METHOD FOR PERFORMING SITE-SPECIFIC AFFINITY FRACTIONATION FOR USE IN DNA SEQUENCING

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

1. Field of the Invention

This invention relates to miniaturized reaction vessels and the use of such vessels and more specifically, this invention relates to miniaturized reaction vessels and arranging the vessels in an array for performing various biochemical procedures that require at least one reactant to be attached to a solid substrate.

2. Background of the Invention

The need to contain and manipulate small quantities of reactants is widespread. For example, forensic activities often deal with micro-quantities of DNA, bodily fluids, explosives, pesticides, microorganisms, toxins and other residues in trace amounts. Enzyme-linked immunoadsorbent assay (ELISA) procedures are such situations where small quantities of reactants are utilized.

Currently, devices exist to facilitate the containment and mixing of small quantities of reactants. Some of these devices include microtiter plates and microwell plates having reaction volumes in the range of 1 to 10 microliters. Such devices are frequently used in situations where one of the reactants need to be immobilized.

However, there are some instances where smaller reaction volumes are required (i.e., between approximately 0.1 nanoliters and 100 nanoliters) or where increased density of the immobilized component is sought for the purpose of increasing reaction output. In addition, economics often dictate limited use of mobile reactants viz. the immobilized fraction, particularly where the liquid state reactants are available in limited quantities. In such scenarios, concentrations of the reactants can be increased when the total necessary volume of the solvent decreases.

There are also instances where site-specific manipulation of molecules and construction of molecular combinations is desired, taking into consideration tendencies of repulsion, aggregation, steric hindrances, etc. Such instances would require multi-step procedures at the same molecular site and under the same reaction conditions.

Currently, no device or procedure exists to facilitate molecular interactions of the types mentioned supra.

A need exists in the art for a device to contain nanoliter quantities of reactants to facilitate specific interactions between the reactants. The reaction vessel must be designed to exploit steric and solution limitations associated with instances where specific molecules are manipulated. Finally, the device must be constructed with widely available materials and also must be easy and economical to use.

SUMMARY OF THE INVENTION

It is an object of the present invention to provide a miniaturized reaction vessel that overcomes many of the disadvantages of the prior art.

Another object of the present invention is to provide a device which facilitates the immobilization of one or a plurality of reactants. A feature of the invention is a plurality of isolated reaction vessels arranged in a predetermined configuration. An advantage of the invention is that each vessel serves as a separate reaction chamber so that the plurality of reaction chambers can be utilized simultaneously to facilitate in parallel fractionation and enzymatic modification, and other modification of target reactants and molecules.

Still another object of the present invention is to provide a method for using an array of miniaturized reaction vessels to facilitate affinity capture procedures. A feature of the invention is treating each vessel as a chromatography microcolumn to be used simultaneously. An advantage of the invention is facilitating the fractionation of a mixture of DNA molecules of known and unknown primary structure, as well as other molecules.

Yet another object of the present invention is to provide a method to facilitate simultaneous multi-chemical reaction processes with many different substrates. A feature of the invention is that specific enzymes react with different or the same substrates that are separated from each other and placed or immobilized within separate, miniaturized reaction chambers which in turn are arranged in a predetermined configuration. An advantage of the invention is that it allows for controlled-multi-step conversions of various compounds and analytes. Another advantage is that when a substrate is confined to a single reaction chamber, site-specific biochemical reactions can be performed.

Another object of the present invention is to provide a method for fractionating and sequencing DNA molecules. A feature of the invention is the use of oligonucleotide arrays to first isolate the target DNA sequence and then the use of a second oligonucleotide array to sequence the isolated DNA more efficiently. An advantage of the invention is the obviation of costly intermediate cloning and mapping steps used in typical sequencing processes.

Still another object of the present invention of the present invention is to provide a protein affinity assay method. A feature of the invention is the isolation and immobilization of different proteins, such as antibodies, in specific elements of an array and then exposing the array to a particular protein or antigen. An advantage of the present method is the ability to conduct thousands of assays simultaneously thereby providing a universal diagnostic chip, such as for antibody screening.

Briefly, the invention provides a method for conducting affinity fractionation and sequencing of DNA comprising cleaving DNA into predetermined lengths; labelling the cleaved DNA; contacting the labelled DNA to a first array of isolated oligonucleotide sequences, wherein said sequences are complementary to portions of the DNA; allowing hybridization to occur between said cleaved DNA and the sequences; extracting the hybridized DNA from the sequences; contacting said extracted hybridized DNA with a second array of immobilized oligonucleotide molecules, wherein some of the oligonucleotide molecules in the second array have base sequences that are complementary to said extracted hybridized DNA; allowing the extracted hybridized DNA to re-hybridize with the second array of oligonucleotide molecules; and attaching labelled oligomers to the second array of oligonucleotide molecules, wherein the labelled oligomers have sequences that are complementary to the re-hybridized DNA.

The invention further provides a method for performing multi-step conversions of compounds comprising supplying an array of polyacrylamide vessels separated from each other by a hydrophobic surface; immobilizing a plurality of reactants in the vessels so that each vessel contains one reactant; contacting the compounds to each of the vessels in a predetermined sequence and for a sufficient time to convert the compounds to a desired state; and if required, isolating the converted compounds from said array.

The invention also provides a method for manipulating nanoliter quantities of molecules comprising removably attaching the molecules to a polyacrylamide vessel having a predetermined nanoliter-scale volume, wherein the molecules are confined to the volume; introducing into the vessel a means to modify the molecules; removing the modifying means from the vessel; and isolating the now modified molecules from the vessel.

BRIEF DESCRIPTION OF THE DRAWING

The invention together with the above and other objects and advantages will be best understood from the following detailed description of the preferred embodiment of the invention shown in the accompanying drawing, wherein.

DETAILED DESCRIPTION OF THE INVENTION

The inventors have developed a process to perform hybridization, fractionation and enzymatic manipulation of molecules in a site specific way. The technique utilizes oligonucleotide chips arranged as high density arrays. The combination of the above-identified reactions into a simplified procedure obviates the need for intermediate mapping and cloning of fractionated products. As such, this new technique is a radical departure from typical sequencing processes.

Figure 1:
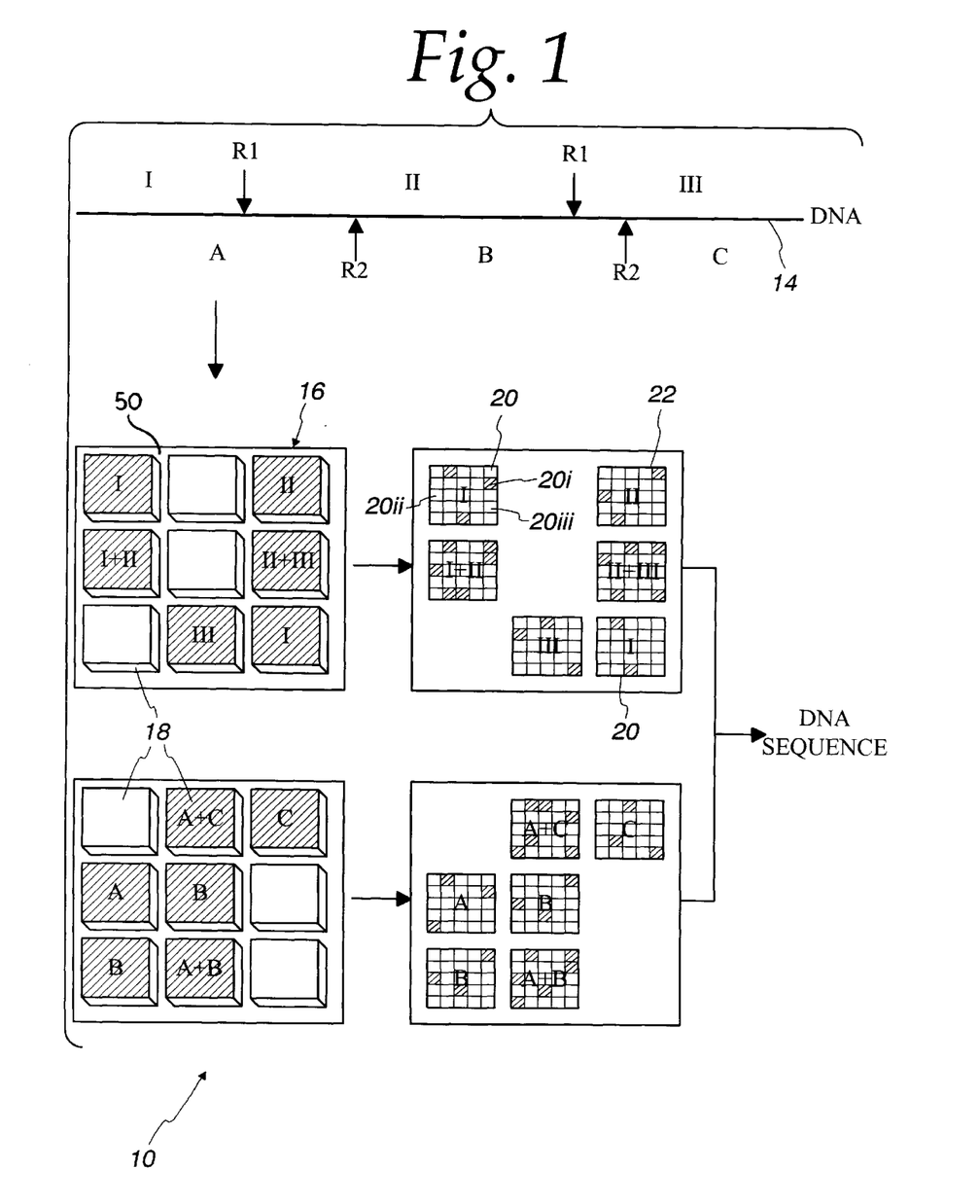
FIG. 1 is a schematic diagram of the invented method, in accordance with the present invention.

Generally, the invented process for fractionating, sequencing, and enhancing target DNA is depicted in FIG. 1 as numeral 10. A first step is the cleavage of a specific single-strand DNA molecule 14 with restriction enzymes R1 and R2 to create a plurality of sets of fragments, wherein fragments of one set overlap fragments of another set. In FIG. 1, two sets of fragments are depicted, with one set having fragments I, II and III, and another set having fragments A, B and C. Then, the sets of fragments are loaded onto an array 16 or plurality of arrays containing a plurality of gel elements. Each gel element 18 contains a different immobilized oligonucleotide string of specific length and sequence that is complementary to a portion of the fragmented DNA.

After allowing the fractionated DNA to hybridize with complementary sequences, the hybridized DNA from a specific gel element 18 is extracted from the element 18. The extracted DNA could be labeled at this point and then placed on a second array 20 containing individual gel elements 20$i$, 20$ii$, 20$iii$, etc., each gel element known to contain a specific isolated immobilized oligomer. In FIG. 1, a second array 22 also is depicted containing immobilized oligomer complementary to fragment II.

The second array 20 is scrutinized for the presence of the label. Those specific gel elements, 20$i$, that contain labeled oligomers indicate that complete hybridization of the target DNA fragment 22 has occurred. The overlapping of these perfectly hybridized oligonucleotides enables one to reconstitute the DNA sequence. Therefore, invented method provides for efficient fractionation and sequencing of DNA.

As noted above, the process of sequentially manipulating molecules involves the use of miniaturized reaction vessels. Generally, each vessel consists of a specific volume or construct of polyacrylamide, whereby the polyacrylamide construct is immobilized on a hydrophobic surface such as glass.

Each construct can range in size from approximately 0.06×0.06×0.02 millimeter to 1×1×0.02 millimeter. Each construct serves as a 70 picoliter (picoliter=$10^{-12}$ liter) or a 20 nanoliter (nanoliter=$10^{-9}$ liter) micro-test tube in as much as the constructs are arranged relative to each other in an array on a hydrophobic surface.

Array Manufacturing Detail

The construct array is manufactured via a modified Methylene Blue induced photo-polymerization procedure whereby a polyacrylamide solution is prepared and then configured into gel pad molds having the desired shapes and sizes for subsequent polymerization. After polymerization, a specific oligonucleotide is applied and chemically modified to each gel pad. A detailed description of the array manufacturing procedure is contained in a co-pending U.S. patent application, having Ser. No. 08/592,120, assigned to the instant Assignee, and incorporated herein by reference.

DNA Fractionation

Complementary interactions are effectively used for affinity fractionation of nucleic acids by hybridization with a complementary strand immobilized on a solid support. Fractionation on an oligonucleotide array is an alternative to DNA cloning for isolating specific fragments from DNA digests.

Chip fractionation is followed by conventional sequencing or by sequencing by hybridization with oligonucleotide chips. In the later scheme, devised by the inventors, DNA is first digested with restriction endonucleases, then the fragments are fractionated on the oligonucleotide chip and finally transferred from this chip onto a sequencing microchip.

Three scenarios can be considered in this scheme. In the first scenario, approximately 16 to 120 fragments having an average length of 250 bases are generated by cutting cloned plasmid or cosmid DNA respectively, with 4 bp-long specific restriction endonucleases. These fragments can be sequenced by conventional gel methods or by using sequencing microchips. In the second scenario, the cosmid, BAC and YAC DNAs are digested into about 8, 25, and 125 fragments of about 4,000 bases with the use of 6 bp-long specific restriction endonucleases. These fragments can be directly sequenced following the chip fractionation by the "walking primer" procedure or by the use of contiguous stacking hybridization on a sequencing microchip, as disclosed in U.S. patent application Ser. No. 08/587,332, and incorporated herein by reference. In the third scenario, bacterial DNA are specifically split into 100 fragments of the Cosmid size. The fractionated products are then treated by the processes outlined in the first or second scenarios, discussed supra.

To effectively separate the fragments from each other, each gel element of an array must contain oligonucleotide strings that are unique for specific fragments. The longer the oligonucleotide string and the shorter the fragmented DNA, the higher the probability that a sequence complementary to the oligonucleotide string will be unique for only one of the fragments. Concurrently, the probability P that the oligonucleotide string will hybridize at all with any fragment present in the mixture, will be lowered. The use of longer oligonucleotide strings increases the fractionation efficiency but this demands larger chips.

Conversely, the shorter the length of immobilized oligonucleotide strings, the higher the hybridization sensitivity to single-base-pair mismatches; however, the stability of the formed duplexes decrease. Furthermore, single-stranded nucleic acids form relatively stable hairpins and tertiary structures that interfere with their hybridization with shorter oligonucleotide immobilized fractions. The inventors have found that the introduction of base analogs or the substitution of negatively charged phosphodiester groups in the immobilized oligonucleotides for some neutral or even positively charged groups significantly increases duplex stability viz. hairpin stability. For example, substitution of negatively charged phosphate groups for positively charged guinidinium linkages renders the duplex of thymidil 5-mers with poly(rA) stable even in boiling water.

Figure 2:
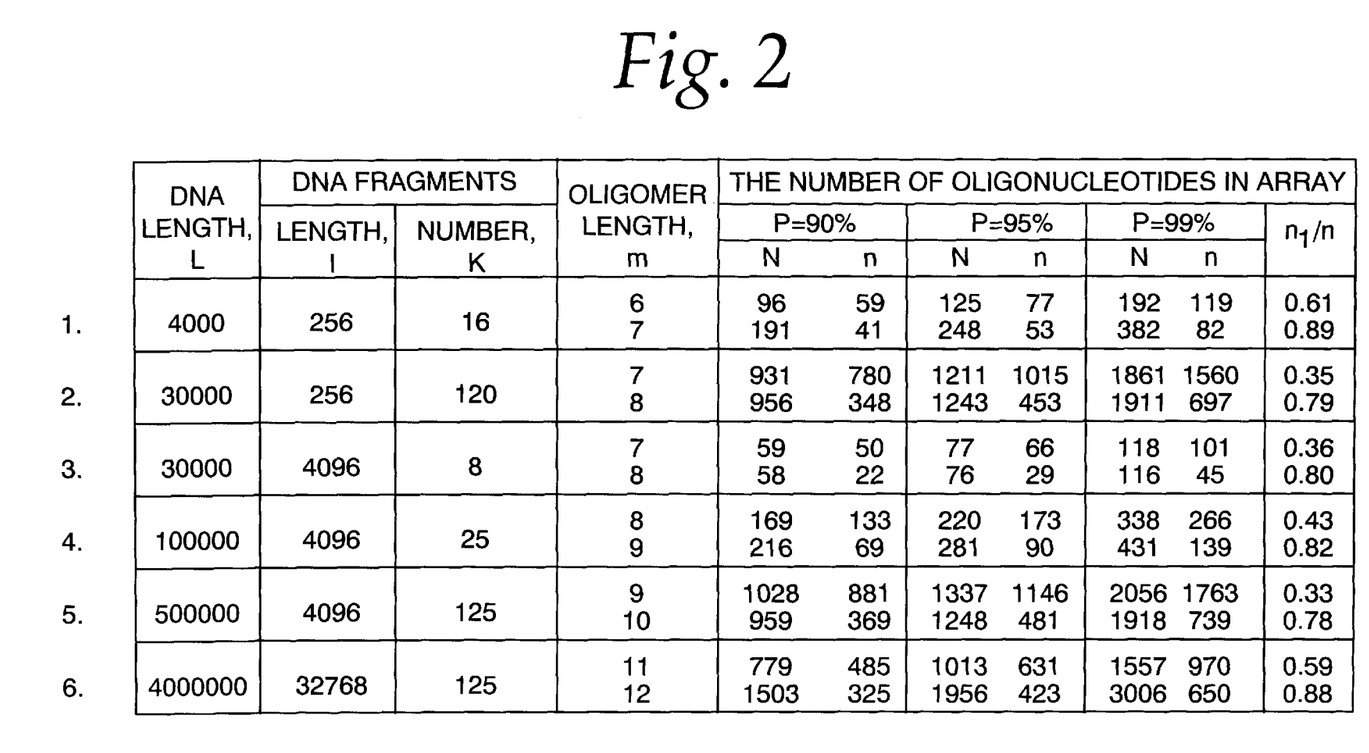
FIG. 2 is a table of DNA hybridization probability values, in accordance with the present invention.

The inventors have made probability calculations to balance fractionation efficiency with chip complexity. These calculations are presented in FIG. 2. Briefly, FIG. 2 provides the calculated values for the numbers N and n of oligonucleotides of length m, such lengths ranging from 6-mer (i.e. hexamers) to 11-mers (i.e. undecamers).

The calculated values are specific for an array capable of fractionating a mixture of a specific number (K) of random sequenced, DNA fragments having a length I, with 90 percent, 95 percent and 99 percent probability. Fragments of about 250 and 4,000 bp are generated when DNA cloned in YACs, BACs, cosmids and plasmids are digested by restriction endonucleases specific for 4 and 6 bp cleavage, respectively.

N signifies the minimal number of oligonucleotides in such an array wherein each fragment is bound at a specified probability to any gel pad which binds no other fragments. Numbers $n^1$ and n designated the number of oligonucleotides among N that bind, respectively, the only one or one and more fragments. The ratio $n^1/n$ represents the efficiency of the array by indicating the share of such cells which participate in DNA binding and which contain only one fragment from the mixture.

The table in FIG. 2 can be utilized as follows: As can be noted in line 1 of FIG. 2, to fractionate sixteen 250 bp-long fragments of plasmid DNA (4,000 bp in length) at 90 percent probability, gel arrays containing 96 properly selected non-correlating 6-mers need to be employed. Among these 96 hexamers, fifty nine will bind DNA, with 61 percent of those fifty nine (according to a 61 percent probability estimated at the far right of the table), or 36 hexamers, isolating a single fragment from the mixture.

Fractionation of a complex mixture of DNA fragments may require large arrays. For example, and as can be noted in line 5 of FIG. 2, to separate 125 DNA fragments of plasmid size in the digest of 500,000 bp long YAC DNA with 99 percent probability, the fractionation array would require 1,918 oligonucleotides of 10-base lengths. The size of such a complex array is approximately 9 centimeters×9 centimeters, if each gel element is 1×1 mm and if the elements have 2 mm center-to-center spacings relative to each other.

In such instances, fractionation and specific fragmentation can be carried out in two rounds to obtain DNA fragment sizes that are manageable for sequencing. For example, as can be noted in line 6 of FIG. 2, 4,000,000 bp-long genomic DNA of *E. coli* could be fractionated using an array containing 1,557 oligonucleotides to produce approximately 125 fragments of a cosmid's size (30,000 bp). As can be noted in line 3 of FIG. 2, these cosmid-size fragments can be digested further to approximately 4,000 bp-fragments with arrays containing 118 or 116 oligomers of 7-mer or 8-mer lengths, respectively.

DNA digestion with at least two different restriction endonucleases should be performed to obtain overlapping sequences.

Then each digest should be fractionated and sequenced to reconstitute the DNA sequence from the structure of the overlapping fragments.

To fractionate double-stranded DNA, each chip element should contain oligonucleotide strings complementary to each target strand. However, if one needs to separate both complementary DNA strands, the complementary oligonucleotides should be immobilized in different microchip pads. This will necessitate a doubling of the number of gel elements in the array.

An efficient fractionation of single-stranded DNA was carried out by its hybridization with a chip containing gel-immobilized decamers. DNA was extracted separately from each decamer gel cell, transferred onto a sequencing microchip and analyzed thereon. In the phosphorylation sequence, decamers of the chip were enzymatically phosphorylated, then hybridized with DNA and ligated with a pentamer in a site directed manner. This enhanced the efficiency of sequence analysis by increasing the length of specified oligonucleotides of the chip. Overall, the invented techniques illustrate the efficiencies for analyzing DNA and for the sequencing of long DNA without the need for intermediate cloning and mapping.

Figure 3:
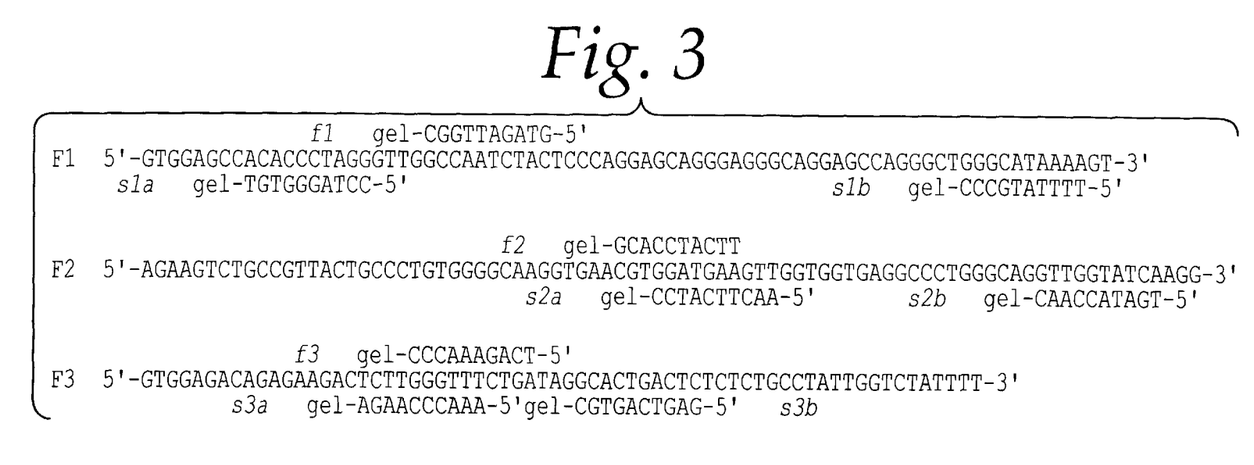
FIG. 3 is a conceptual view of interactions between reactants contained in the invented miniaturized vessel, in accordance with the present invention.

Three nested fragments F1, F2, and F3, all shown in FIG. 3, were amplified separately with fluorescently labeled sense primers (5'-TMR-gtggagccacaccctagg-3') for F1, 5'-TMR-agaagtctgccgttactgcc-3' for F2, 5'-TMR-gtggagacagagaagactcttgg-3' for F3 fragments and antisense primers (5'-acttttatgcccagccctg-3' for F1, 5'-ccttgatccaacctgccc-3' for F2, 5'-aaaatagaccaataggcagagagag-3' for F3 fragments). Reaction mixtures contained 50 nanograms (ng) of 421 base pair (bp) long DNA—target and corresponding primers.

Amplifications were carried out in 30 cycles: 94° C. for 30 seconds, 50° C. for 40 seconds, 72° C. for 20 seconds. 3 μl of each PCR mixture were used for single primer reamplification with corresponding fluorescently labeled sense primers. 40 cycles of amplification were carried out under the conditions described in Yershov G. et al., (1996) *Proc. Natl. Acad. Sci. USA*, 93, 4913–4918, and incorporated herein by reference. 50 μl of each PCR mixture were precipitated separately with 500 μl of 0.2 M $LiClO_4$ in acetone, and the remaining 50 μl of each mixture were combined in a single tube and also precipitated. The pellets were washed with acetone and dissolved in hybridization buffer (1M NaCl/1 mM EDTA/10 mM Na-phosphate, pH 6.8)

Figure 4:
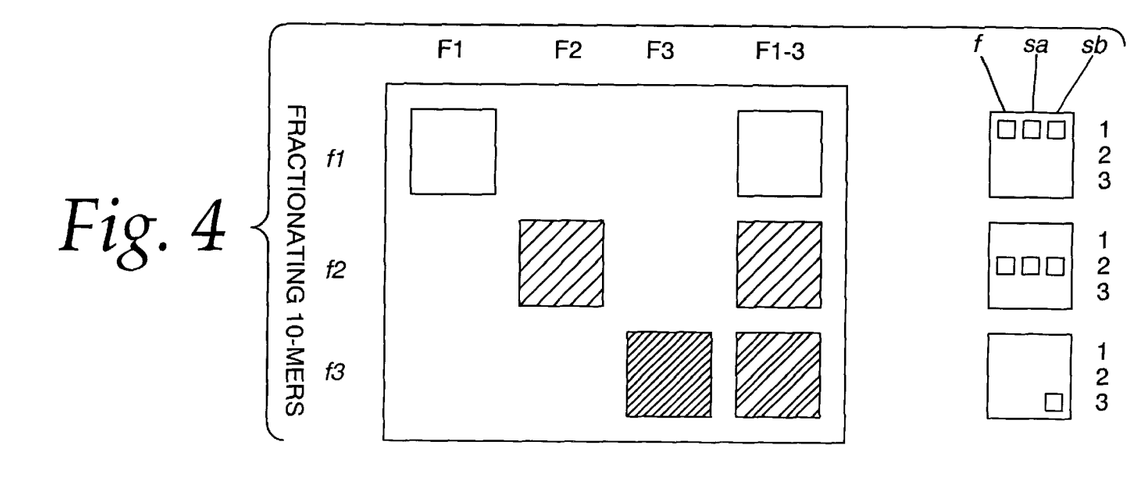
FIG. 4 is a schematic view of arrays of fractionation vessels containing products of reactions, such as fractionated DNA, in accordance with the present invention.

Three decamers (15 pmol each) f1, f2, and f3 complementary to F1, F2 and F3 respectively (as shown in FIG. 3), were immobilized on 1×1×0.02 mm gel elements of a fractionation array, as depicted in FIG. 4A.

2 μl of fluorescently labeled F1, F2, and F3 and a mixture thereof were separately hybridized with the fractionation chip at 4° C. in hybridization buffer to remove non-hybridized DNA. Non-specifically bound DNA was washed off with hybridization buffer at 15° C. for 5 minutes.

DNA fragments were eluted separately at 40° C. with 3 μl of hybridization buffer from each of three F1–3 elements of the fractionation chip and hybridized with each of three clusters of the sequencing microchip (FIG. 4B) under the same conditions as described above. The sequencing array (FIG. 4B) contained three identical clusters consisting of nine decamers that were complementary to F1, F2, or F3. Fluorescence hybridization images of fractionation and sequencing chips were monitored with a fluorescence microscope equipped with a CCD camera and software, as disclosed in Yershov, et al., noted supra.

FIG. 4B shows that each DNA isolated from the mixture on the gel elements f1, f2 or f3 is hybridized only with the corresponding w sequencing set of decamers and thus can be unambiguously identified. Cross-hybridization of the decamers with DNA of the other two fractions was negligible. These results demonstrate how the invented miniaturized reaction vessel promotes high efficiency DNA fractionation and suitable accuracy of sequence analysis on sequencing gels comprising similar vessels.

Phosphorylation Detail

Due to the hydrophobic spacing 20 between the gel elements 22, site-directed reactions can be carried out selectively in specified elements of the chip. 50 pmole of synthetic oligonucleotide (5'-ataccaacct-$r^{3m}$U-3') was phosphorylated with 10 μl of reaction mixture containing 1×PNkinase buffer (66 mM K-acetate, 10 mM Mg-acetate/5 mM dithiothreitol/33 mM Tris-acetate, pH 7.8), 15 μCi [γ-$^{32}$P] ATP, 500 pmole ATP and 0.5 U T4 Polynucleotide Kinase, available from Epicentre Technologies, Madison, Wis., at 37° C. for 60 minutes.

Figure 5:
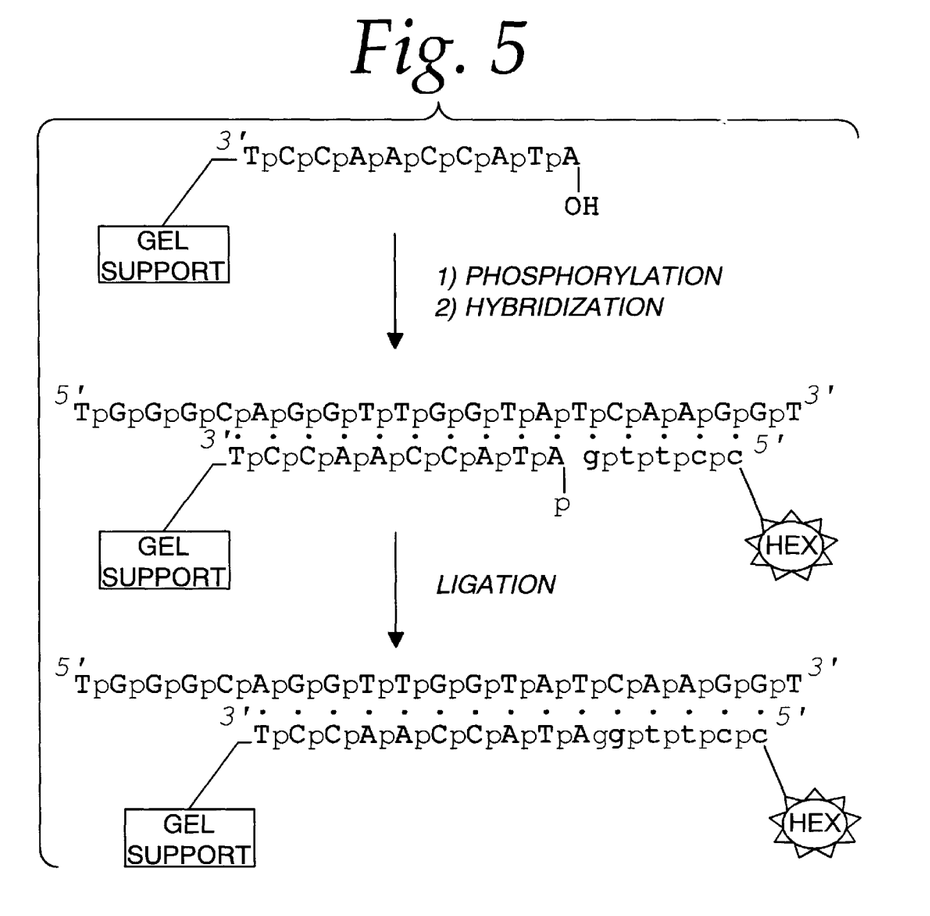
FIG. 5 is a conceptual view of oligonucleotide phosphorylation and ligation reactions facilitated by miniaturized reaction vessels, in accordance with the present invention.
Figure 6:
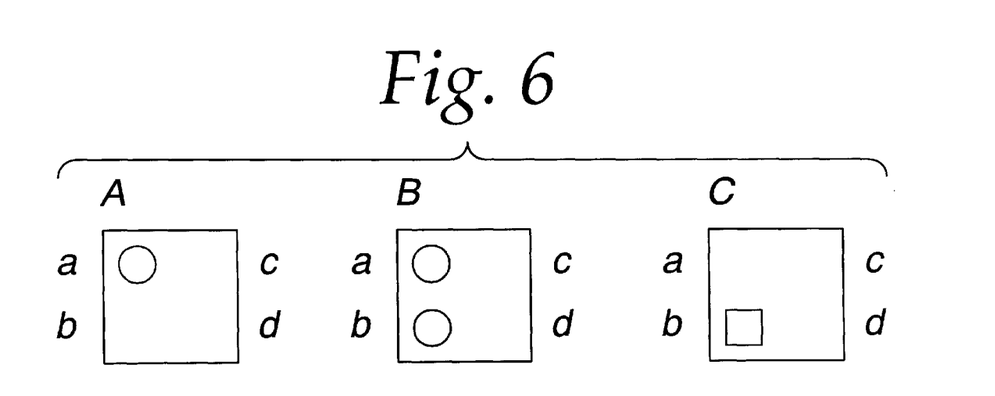
FIGS. 6A–C are schematic views of arrays of reaction vessels containing products of oligonucleotide phosphorylation and ligation reactions, in accordance with the present.

The $^{32}$P-labeled decamer (depicted in FIG. 5) was immobilized within a 1×1×0.02 mm gel construct, labeled as "a" in FIG. 6A and the same non-phosphorylated oligonucleotide was immobilized within the constructs labeled as "b", "c" and "d" in FIGS. 6B, 6C, and 6D, respectively, at a concentration of 5 pmole of oligonucleotide per construct.

Immobilization was carried out at 20° C. for 12 hours. The array 6a containing the phosphorylated oligonucleotide was washed with washing buffer (0.2 M NaCl/0.2 mM EDTA/2 mM Na-phosphate. pH 6.8) at 37° C. for 1 hour and then rinsed with water. The chip was dried and radio-autographed with Kodak Scientific Imaging Film X-OMAT™ (Eastman Kodak, Co., Eastman, Tenn.)

1 μl of phosphorylation mixture [1.5 μCi [γ-$^{32}$P] ATP, 50 pmol ATP and 0.05 U T4 Polynucleotide Kinase in 1×PNkinase buffer (Epicentre Technologies, USA)] was added to gel element B. As a control, the same mixture, excluding Kinase, was added to gel element c. An alternative control is the addition of 1 μl of 1×PNkinase buffer added to gel element "a." Enzymatic phosphorylation is carried out at 37° C. for 3 hours at 100 percent humidity. The chip was washed first with washing buffer (0.2 M NaCl/0.2 mM EDTA/2 mM Na-phosphate. pH 6.8) at 37° C. for one hour, then with water, dried and radio-autographed.

As is illustrated in FIG. 6B, the $^{32}$P label appeared only on gel element "b" with no cross contamination to gel elements c or d being observed. This illustrates the efficiency of phosphorylation of the gel-immobilized oligonucleotide.

Ligation Detail

3 μl of a ligation mixture was prepared, containing 10 pmol of ssDNA 5'-tgggcaggttggtatcaaggt-3' (complementary to the immobilized decamer), 50 pmol of fluorescently labeled pentamer 5'-HEX-ccttg-3' (stacked to the immobilized decamer), 1 mM ATP, and 01. U T4 DNA Ligase (available from Epicentre, Technologies, Madison Wis.) in 1×T4 DNA Ligase buffer (6.6 mM K-acetate/10 mM Mg-acetate/33 mM Tris-acetate, pH 7.8). These reactants were added to each of the "b" and "c" gel elements in FIG. 6C. Ligation was carried out at 4° C. for 5 hours, then the chip was washed with washing buffer (0.2. M NaCl/0.2 mM EDTA/2 mM Na-phosphate, pH 6.8) at 10° C. for 5 minutes. Fluorescence hybridization on the chip was monitored with a fluorescence microscope, per the technique outlined in Yershov, supra.

Figure 7:
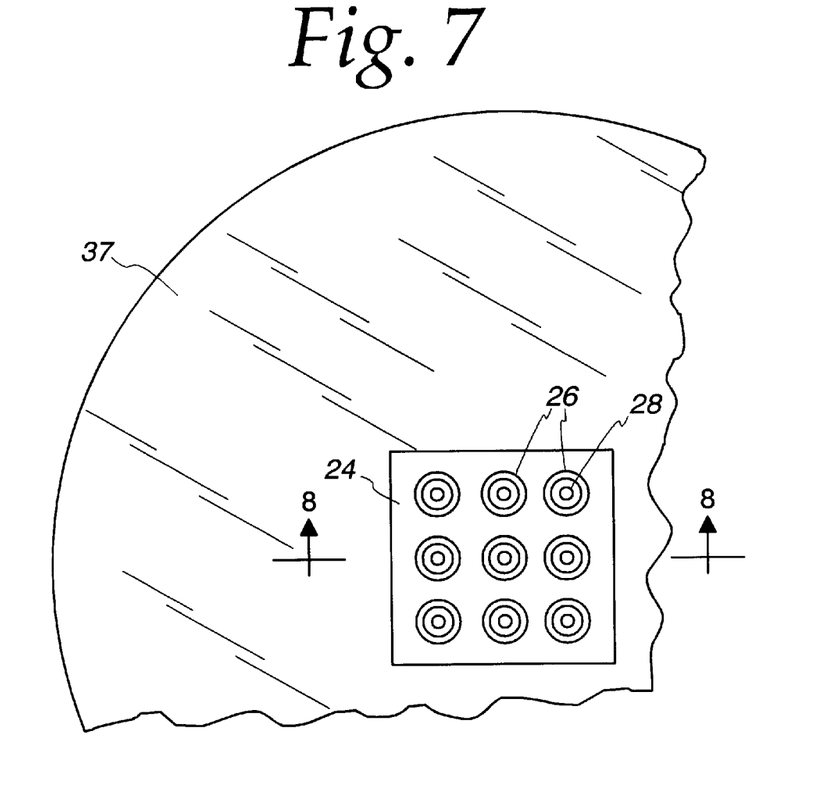
FIG. 7 is a plan view of a device for microdispensing aqueous solutions, in accordance with features of the present invention.
Figure 8:
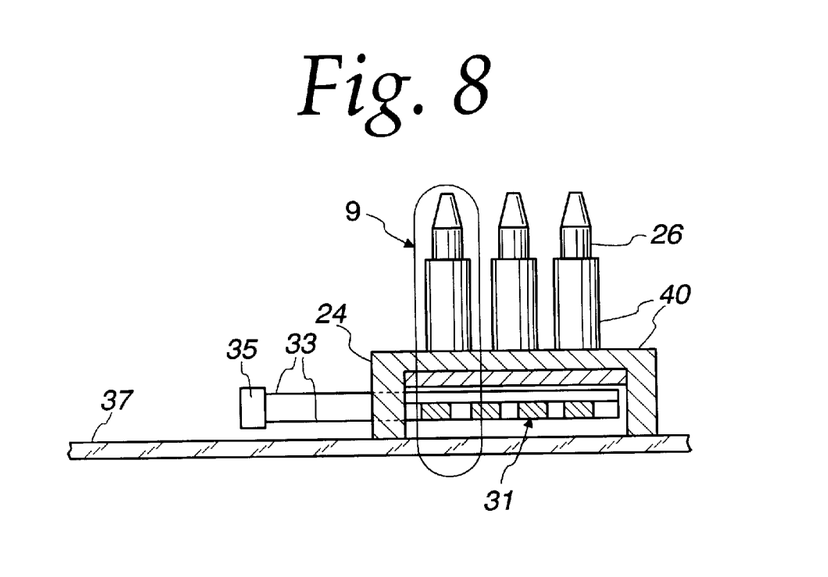
FIG. 8 is an elevational, cross-sectional view of FIG. 6, taken along line 7—7.
Figure 9:
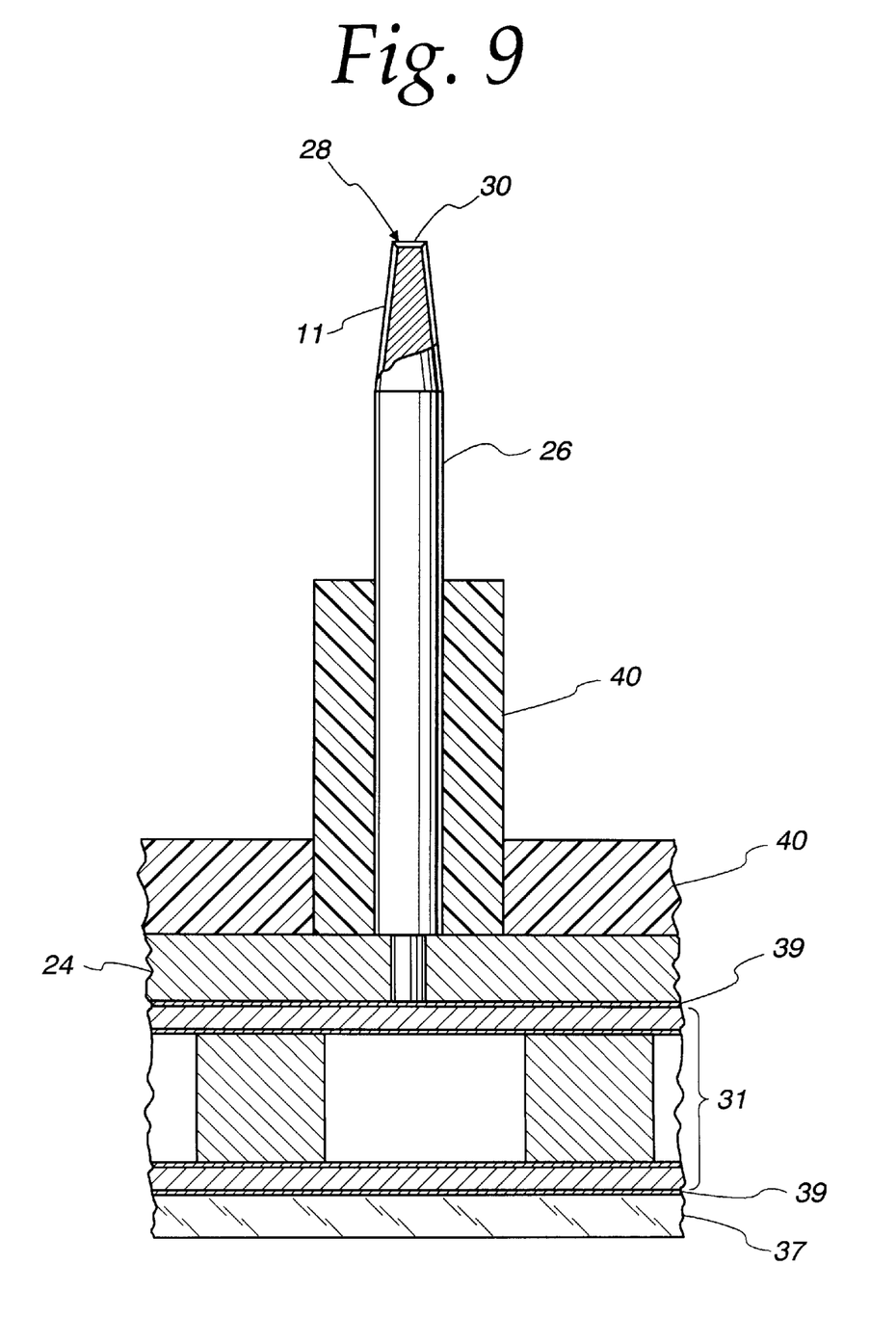
FIG. 9 is an elevational, cross-sectional view of one of the microdispensing probes, in accordance with features of the present invention.

As can be noted in 7C, the fluorescence label is observed only in gel element "b" of FIG. 6C. As with the phosphorylation procedure above, the miniaturized vessels facilitate site directed ligation.

Oligonucleotide Loading Detail

The inventors have developed a specific method for loading oligonucleotides onto the miniaturized reaction vessels. The method is fully disclosed in PCT/RU 9400179. Described briefly, a pin is immersed into, and is wetted with, oligonucleotide solution. After being withdrawn from the solution, the pin is contacted with the gel surface.

During oligonucleotide aspiration, transfer and deposition, the temperature of the pin must be maintained near dew point at ambient temperature so as to prevent evaporation. Otherwise, the viscosity of the solution microvolumes (typically 10 nanoliters or less) will lead either to complete evaporation or to incomplete transfer of the desired dose.

The invented transfer method allows for the transfer of a range of micro-volumes of oligonucleotide solutions, from 0.3 to 50 nanoliters (nl), with a dispensing error of no more than approximately ±20 percent. As disclosed in the above-identified PCT application PCT/RU94/00179, the device for micro dispensing aqueous solutions of solutions is depicted in FIGS. 7–11. The device comprises a base 24 shaped as a rectangular plate, one side of which carries a plurality of rods 26 held with one of their ends to said plate. The rods 26 are arranged parallel to one another and spaced equidistantly to one another. Butt ends 28 of the rods are coplanar with one another and parallel to the base 24. A battery 31 of thermoelectric cells (e.g. Peltier elements) adjoins the base 24 on the side opposite to that equipped with the rods 26 and is in heat contact therewith. In this particular embodiment, the battery 31 is shaped similar in size to the base 24. The battery 30 is connected through wires, 33, to a controlled source 35 of direct-current. The battery 31 of thermoelectric cells is a means for maintaining the temperature of the butt ends 28 of the rods 26 equal essentially to the dew point of the ambient air. With its other side, the battery 31 of Peltier elements adjoins the surface of a flow-block radiator 37 and is in heat contact therewith. To provide a uniform heat contact between the surface of the battery and the base on one side, and between the radiator 37 on the other side, provision is made for thin (under 100 microns thick) layers 39 of a heat-conductive paste based on beryllium oxide and polydimethyl-siloxane oil.

The base 24 and the rods 26 are made from a material having high thermal conductivity, preferably from a metal, such as copper or brass. The radiator 37 can be a silicon slab.

The rods 26 are provided with a heat-insulating coating 40 applied to half their length, including from the point of the rod attachment to the base plate 24. Material for the coating in this region can be polyolefin. One polyolefin product is Heat Shrinkable Pack, available through RS Components Ltd., England. The heat insulating coating 40 used to protect the surface of the base 24 exposed to atmospheric air can be formed polyurethane.

The rods 26 in the embodiment illustrated are round in cross-section (though they may have any other cross-sectional shape) and their vacant ends are shaped as cone frustums tapering to the ends. A hydrophilic coating 30 such as glass or gold, is applied to the butt ends 28 of the rods 26, whereas a hydrophobic coating 11 such as fluoroplastic, or glass whose surface is hydrophobized by treatment with Repel Silane, is applied to the side surfaces of the vacant ends of the rods.

The area of the butt ends 28 of the rods is selected such as to obtain the required volume V of the dose being transferred and to obey the following relationship: $V \approx \frac{1}{3}\pi R^3 \cdot 10^{-6}$ nanoliters, where V is the required volume of the droplet forming on the butt rod end after the rod has been withdrawn from the solution, and R in microns is the radius of the butt rod end.

Figure 10:
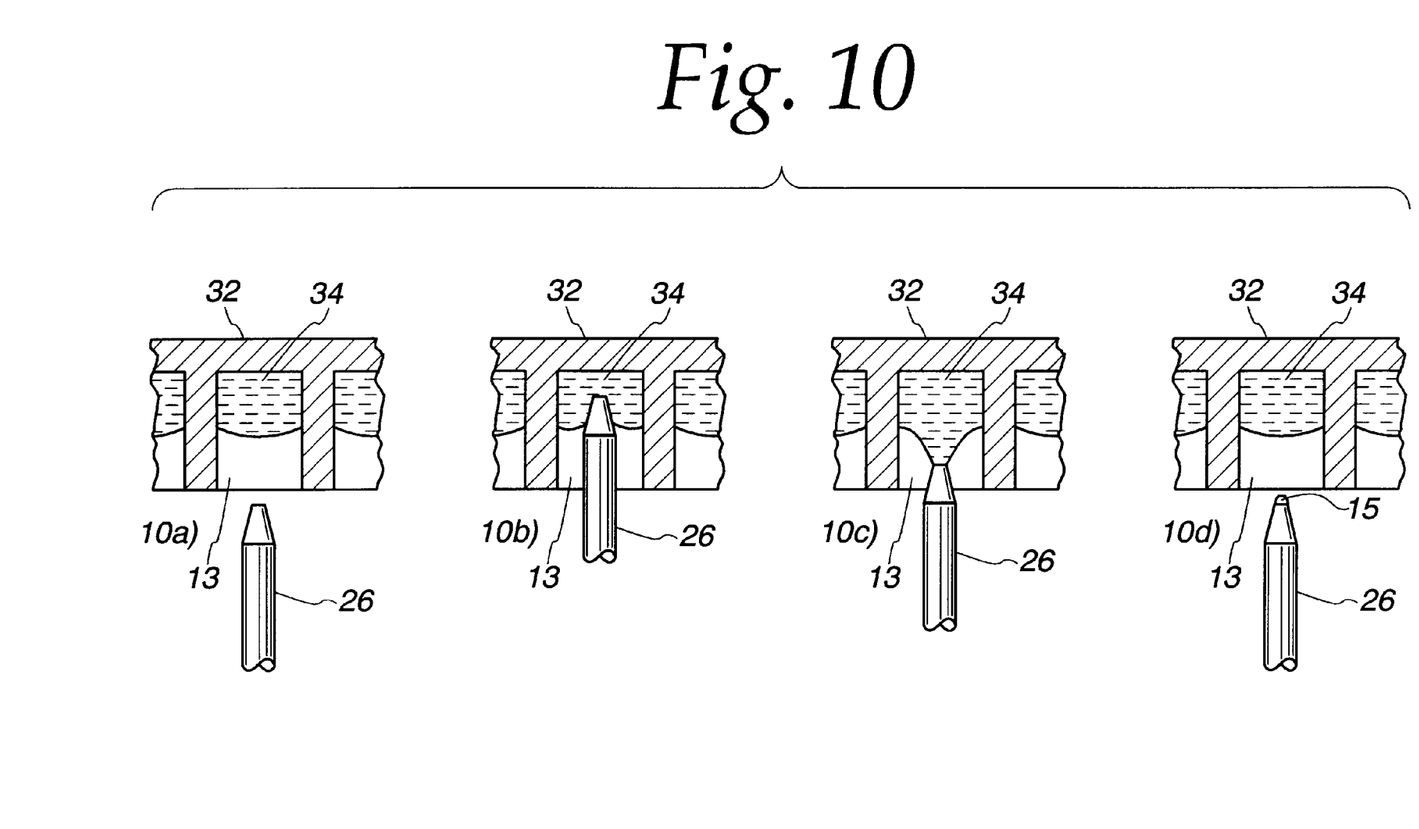
FIG. 10 is a detailed view of harvesting of aqueous solutions, in accordance with features of the present invention.

The device as described above is used as follows to facilitate liquid transfer: The base 24 carrying the rods 26 are positioned opposite to the tray 32 in such a manner that each rod is located against a respective well 13 of the tray 32 filled with an aqueous solution 34 of the substance to be transferred, e.g., an aqueous oligonucleotide solution. Then the base 24 is displaced towards the tray 32 until the ends of the rods 26 (FIG. 10b) contact the solution 34. Then, by displacing the base 24 together with the rods 26, (FIG. 10c) in the opposite direction, the rods 26 are withdrawn from the solutions, with the result that a microdose 15 (FIG. 10d) of the solution of the substance is formed on the butt end of each rod 26. The volume V of the microdose is independent of the depth of immersion of the rod 26 into the solution 34 (due to the hydrophilic butt end of the rod and hydrophobic coating on the rod's side surface with respect to the solution being transferred) and is determined substantially by the radius R alone of the butt end of the rod 26.

Figure 11:
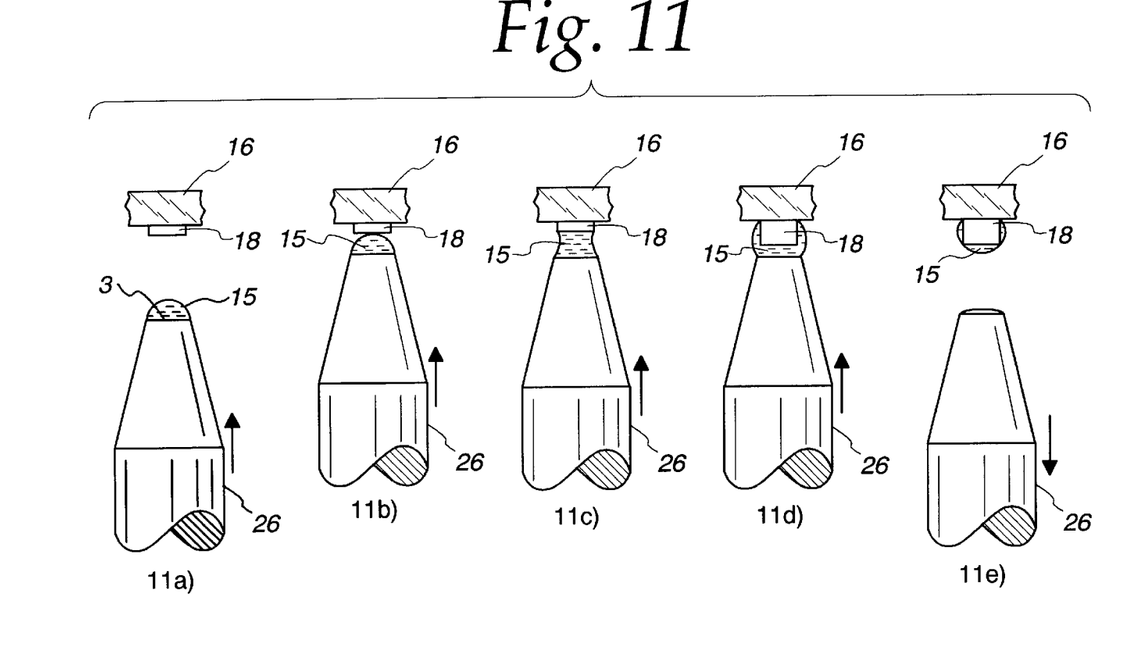
FIG. 11 is a detailed view of the deposition of aqueous solutions, in accordance with features of the present invention.

Next, the base, together with the rods loaded with the microdoses of the solution, is transferred to the gel elements 18 arranged in a micro matrix of the type depicted in FIG. 1. The layout of the gel elements 18 complement the configuration of the oligonucleotide-loaded rods so that when the base 24 is positioned opposite to the surface of the matrix, each rod 26 is opposing a respective gel element 18. Thereupon, the base 24 is displaced towards the matrix 16 along the arrow as depicted in FIG. 11b, until the microdoses 15 contact the gel areas 22. During transfer, the temperature of the solution 34 and the butt ends 28 are maintained at the dew point of the air to minimize evaporation of the solution during the transfer. Control of the temperature of the butt ends 3 are attained by changing the battery 4 voltage of the thermoelectric cells in response to the signal produced by a temperature transmitter (not shown) in heat contact with the base.

Upon contact with the microdose 15, the gel element 18 vigorously absorbs the solution (FIG. 11c), with the result that the gel elements 18 swell and the microdoses are drawn into the gel.

After fluid transfer, the base 24 supporting the rods 26 is retracted from the micro matrix. The rods then are washed and dried for reuse.

Oligonucleotide Immobilization Detail

The inventors have developed an immobilization procedure for coupling macromolecules to acrylamide gels so as to minimize liquid evaporation during immobilization and to also ensure that covalent bonding of oligonucleotides to the gel matrix units proceeds to completion. This procedure is more fully disclosed in PCT/RU 9400178 and incorporated herein by reference.

Briefly, the immobilization process is as follows: Microvolumes of bioorganic solutions are loaded onto the micromatrix cells, with the temperature of the micro-matrix being maintained equal to that of the ambient air. Once the micro-volumes of the oligonucleotide solutions have been applied to the cells of the matrix, the micro-matrix temperature is set equal to or below the dew point of the ambient air. This temperature is maintained until swelling of the gel is complete and non-coalescent droplets of water condensate appear in the spacings between the gel pads.

After the appearance of the water condensate, a thin layer of an inert, non-luminescent oil is applied to the micromatrix surface so as to prevent oligonucleotide evaporation.

The micro-matrix is kept under the oil layer until completion of the oligonucleotide immobilization process, and preferably for 48 hours. The oil is then removed by washing with a polar substance that will not cause oligo denaturing, such as ethanol, or water. The matrix is dried and stored indefinitely, ready for use.

Probability Calculations

The probability, $q_+$ for a fragment with the random sequence of length l to get into a fractionating cell containing immobilized m-mers can be described by the relation $q_+ = 1-(1-1/(4^m))^{l-m+1}$, hence, the corresponding probability of its not getting into a cell of same kind is $q_- = (1-1(4^m))^{l-m+1}$.

With K fractions available, the probability that at least one fragment will get into a randomly chosen fractionating cell is expressed as $P_{\geq 1} = 1 = q.k$. For N non-correlating fractionating cells, the expected average number of filled cells can be written as $n = N^* P_{\geq 1}$. At the same time, the expected probability for a single fragment getting into the cell is determined by the relation $P_1 = K \cdot q_+ \cdot q_- k-1$.

The ratio of cells with the one fragment to all filled cells is given by $n^1/n = P_1/P_{\geq 1}$.

Array Manufacturing Detail

The array manufacturing method, noted supra, incorporates a modified Methylene Blue induced photopolymerization procedure whereby a polyacrylamide solution is prepared and then configured into desired shapes and sizes for subsequent polymerization.

Figure 12:
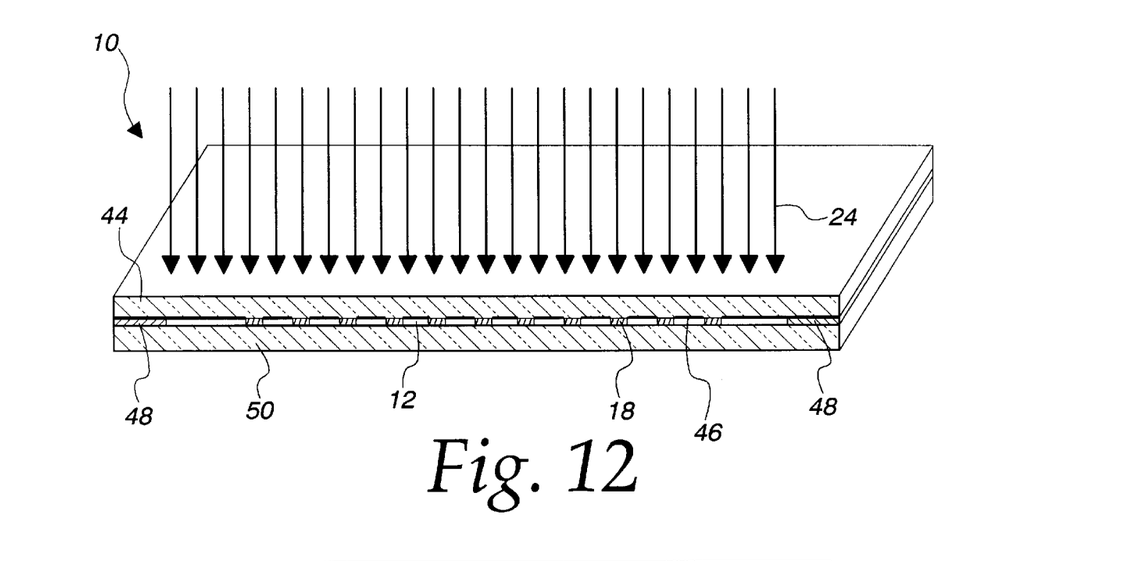
FIG. 12 is an elevated view of a polyacrylamide matrix assembly, in accordance with features of the present invention.
Figure 13:
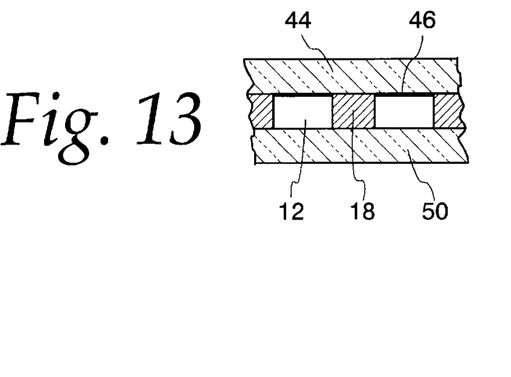
FIG. 13 is a magnified view of the polyacrylamide matrix assembly depicted in FIG. 12, in accordance with features of the present invention.

The production of gel-matrices involves the construction of polymerization units into which prepared acrylamide fluids are placed. One exemplary polymerization unit is depicted in FIG. 12, as numeral 10, and partially magnified in FIG. 13.

In one embodiment of the invention, photopolymerizations are performed on a solution containing 40 percent (between 30–45 percent, is suitable) acrylamide/Methylene Bis-Acrylamide (30:1) stock solution and 0.04 percent Methylene blue stock solution in water. The stock acrylamide solution is diluted with water to a concentration ranging from 4 to 8 percent and subsequently degassed with a water pump for 10 minutes. The gel matrix is prepared from a standard mixture of 0.5 μl 0.04 percent Methylene blue solution, 1 ml acrylamide solution and 10 μl N,N,N', N'-tetramethylethilendi-amine (TEMED), from Aldrich (Milwaukee, Wis.).

The resulting liquid (prepolymerized) mixture 12 is applied to a first surface of a quartz substrate 44, which is previously manipulated to contain a photomask. The preparation of the quartz substrate 44 involves applying a mask 46 to the first surface of the substrate 44, and then pretreating the first surface with an anti-wetting agent or an agent to increase the hydrophobicity of the surface. One such anti-wetting agent is a 2 percent solution of dimethyldichlorosilane in 1,1,1,-trichloroethane, having the trade name Repel-Silan™, and manufactured by Pharmacia Biotech of Uppsala, Sweden. Another suitable anti-wetting agent is trimethylchlorsilane. Two identical spacers 48, made from an inert material such as Teflon, of 20 μm thickness are placed on peripheral edges of the first surface of the quartz substrate so as form a pan-like container to confine the mixture 12. As such, a myriad of spacer thicknesses can be employed, depending on the final desired thickness of the polynucleotide chip.

A glass microscope slide 50, first pretreated with a material to attach polyacrylamide to glass, is placed on top of the spacers 48 to form a glass chamber 10. An exemplary pretreatment material is γ-Methacryloxy-propyl-trimethoxysilane, manufactured as Bind Silane by Pharmacia. This entire assembly or chamber 10 is fastened together via a myriad of fastening means (not shown), such as paper clips, tape, or inert adhesive.

A first surface of the quartz substrate 44 has the nontransparent mask 46 (e.g., comprised of an inert opaque material such as chrome coating or permanent ink), containing a grid defining a pattern of the desired topology. The grid is applied to the mask coating surface of the quartz substrate 44 either by hand with a fine point marker or by photolithography, with the size of the gel elements defined by the dimensions of the transparent squares etched into the mask.

Figure 14:
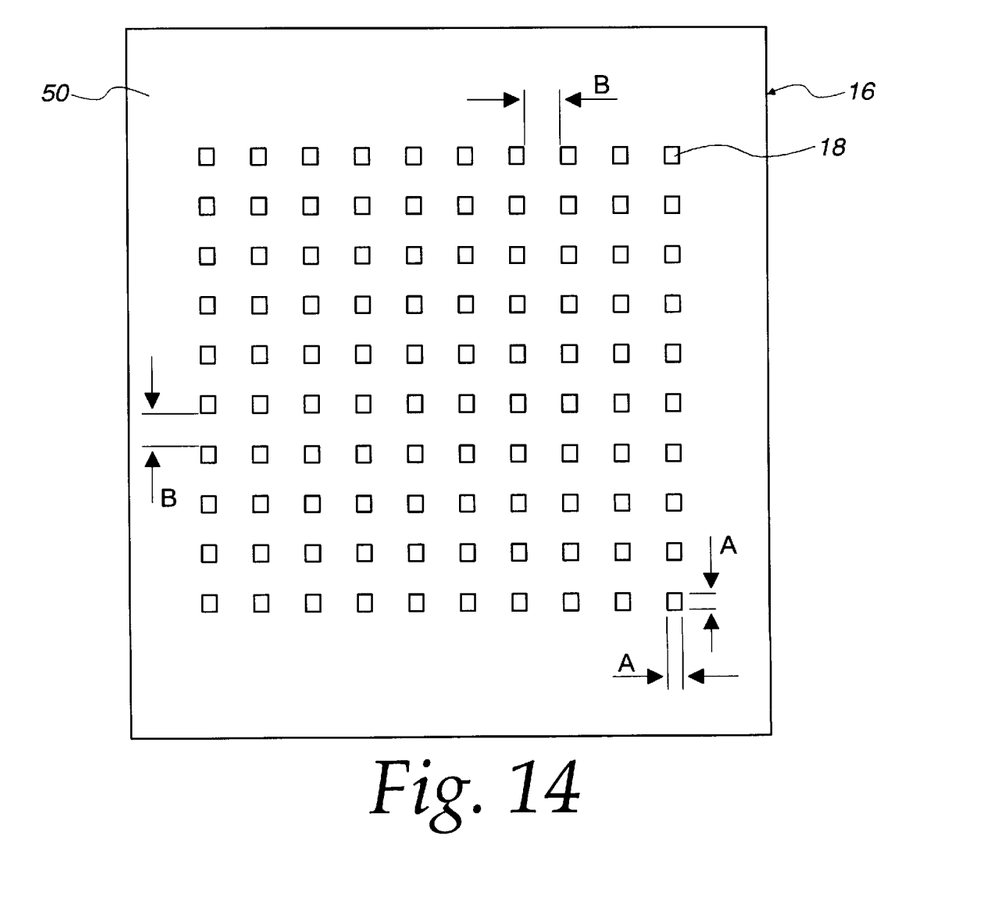
FIG. 14 is a plan view of a gel matrix, manufactured in accordance with features of the present invention.

An exemplary grid is depicted in FIG. 14. Dimensions labeled as element "A" are the sizes of gel cells while elements "B" are illustrated as the spaces between the cells. The mask is designed to block the light, used in the light-induced acrylamide polymerization process, in the spaces "B" between the gel units 18 where gel coalescence is not desired.

Various sizes of gel cells were fabricated on separate masks, as disclosed in Table 1, below.

TABLE 1

Various Gel and Space Dimensions Obtained Via the Invented Process of Light-Induced Polyacrylamide Polymerization

| | Dimensions (μm) | |
|---|---|---|
| Mask # | Gel Cells | Interstitial Spaces |
| 1 | 25 | 50 |
| 2 | 40 | 80 |
| 3 | 100 | 200 |
| 4 | 500 | 1,000 |
| 5 | 1,000 | 2,000 |

After assembly, the assembled polymerization unit 10 is placed under a light source, such as a 312 nm UV-transilluminator such that the quartz substrate 44 is closest to the source. Good results are obtained when the actual photomask layer 20, first deposited on the first surface of the quartz substrate 44, is in contact with the acrylamide solution. UV exposures of approximately 20 minutes provide good results. A myriad of wavelengths are suitable for the light-induced polymerization process, including those found in the range of between approximately 250 nm and 320 nm.

After exposure, the chamber 10 is disassembled. To facilitate disassembly, the chamber 10 can placed in a water bath at room temperature. As noted supra, gel matrix units 18 are retained on the glass where light is allowed to permeate through the mask. These units 18 are separated from each other as a result of opaque mask portions, between the unit regions, precluding gel polymerization.

The resulting gel matrix is washed with water, placed in a solution for a period of time to introduce primary amino groups into the acrylamide (an exemplary solution being hydrazine hydrate). This period of time can range from 35–45 minutes. The matrix is then washed with water, and then treated to neutralize the remnants of the basic pH hydrazine treatment. One such neutralization procedure is placing the matrix in 1 percent acetic acid until neutralization is achieved, perhaps for 10 minutes. After neutralization, the matrix is washed with water, and then treated to remove any electrostatically sorbed chemicals. One such treatment involves placing the matrix in 1 M NaCl for approximately 10 minutes. After a final washing with water, the unit is left to dry, and then treated with a thin film of an anti-wetting agent, such as Repel-Silan so as to make the interstitial glass spaces, designated as "B" in FIG. 14, hydrophobic. This will further isolate the gel units 18 from each other to minimize cross contamination during oligonucleotide loading. Treatment of the anti-wetting agent is brief, approximately 1 minute. The matrix is rendered ready for oligonucleotide loading after a final washing with ethanol (from 96 percent to neat) and then water to remove the ethanol.

While the invention has been described with reference to details of the illustrated embodiment, these details are not intended to limit the scope of the invention as defined in the appended claims.

For example, the invented method is appropriate for drug screening or to construct a protein assay. In one scenario, a myriad of monoclonal antibodies, heavy and light chains from a spleen library is a suitable source, is accumulated via polymerase chain reaction processes. Then each of these antibodies are immobilized in separate gel elements of an array. The array is then subjected to an antigen which is tagged. Those gel elements that light up would serve as starting points for building antibodies specific for that antigen. Further, depending on the size of the array, such arrays of gel cells, or microchips, could serve as a universal antibody diagnostic chip allowing for thousands of assays to occur simultaneously via protein affinity processes.

The embodiment of the invention in which an exclusive property or privilege is claimed is defined as follows:

1. A method for conducting affinity fractionation and sequencing of DNA comprising:

a.) cleaving DNA into predetermined lengths;
   b.) labeling the cleaved DNA;
   c.) contacting the labeled DNA to a first array of isolated single-stranded oligonucleotide sequences, wherein said sequences are complementary to portions of the DNA;
   d.) allowing hybridization to occur between said cleaved DNA and the sequences;
   e.) isolating the hybridized DNA from the sequences via elution;
   f.) contacting said isolated DNA with a second array of immobilized single-stranded oligonucleotide molecules, wherein some of the oligonucleotide molecules in the second array have base sequences that are complementary to said extracted hybridized DNA;
   g.) allowing the extracted hybridized DNA to re-hybridize with the second array of oligonucleotide molecules; and
   h.) ligating labeled oligomers to the second array of oligonucleotide molecules, wherein the labeled oligomers have sequences that are complementary to the re-hybridized DNA.

2. The method as recited in claim 1 wherein the DNA is selected from the group consisting of plasmid DNA, cosmid DNA, bacterial DNA, eucaryotic DNA, and combinations thereof.

3. The method as recited in claim 1 wherein the first array and second array of oligonucleotide molecules further comprise:

a plurality of polyacrylamide gel elements, with each gel element hydrophobically isolated from the other gel elements; and
   at least one oligonucleotide molecule attached to the gel element.

4. The method as recited in claim 1 wherein the first oligonucleotide molecules are between 6 and 12 bases long.

5. The method as recited in claim 1 wherein the DNA molecules are between 200 and 4,000,000 bases long.

6. The method as recited in claim 1 wherein the step of ligating labeled oligomers to the array of oligonucleotide molecules further comprises:

h.) phosphorylating the array molecules; and
   i.) covalently attaching the labeled oligomers to the phosphorylated molecules.

* * * * *